United States Patent
Kouda

[11] Patent Number: 6,152,496
[45] Date of Patent: Nov. 28, 2000

[54] SOCKET FOR PIPE COUPLING

[75] Inventor: Toru Kouda, Tokyo, Japan

[73] Assignee: Nitto Kohki Co., Ltd., Tokyo, Japan

[21] Appl. No.: 09/190,266

[22] Filed: Nov. 13, 1998

[30] Foreign Application Priority Data

Nov. 14, 1997 [JP] Japan .................................. 9-312960

[51] Int. Cl.[7] .................................................. F16L 37/18
[52] U.S. Cl. ........................................ 285/316; 285/319
[58] Field of Search ...................... 285/316, 313, 285/23, 29, 39, 314, 322

[56] References Cited

U.S. PATENT DOCUMENTS

| | | | |
|---|---|---|---|
| 3,826,523 | 7/1974 | Eschbaugh | 285/39 |
| 5,226,680 | 7/1993 | Bahner et al. | 285/314 |
| 5,240,023 | 8/1993 | Shelef | 285/316 |
| 5,310,226 | 5/1994 | Norkey | 285/316 |
| 5,607,139 | 3/1997 | Kjellberg | 285/316 |
| 5,653,480 | 8/1997 | Mine et al. | |
| 5,882,511 | 3/1999 | Blomquist | 285/316 |

*Primary Examiner*—Lynne H. Browne
*Assistant Examiner*—Aaron Dunwoody
*Attorney, Agent, or Firm*—Fulbright & Jaworski, L.L.P.

[57] ABSTRACT

A pipe coupling comprises a cylindrical plug having a peripheral groove formed in an outer peripheral surface, and a socket to be connected to the plug. The socket includes a main body having a receiving hole formed in an end portion thereof for receiving the plug, a sleeve having a front end portion axially slidably inserted in the receiving hole, a base portion located outside the receiving hole, an axial through hole for receiving the plug such that it can slide therein, and a plurality of radial through holes formed therein at circumferentially regular intervals and radially inwardly tapered, and a plurality of lock members received in the radial through holes, part of each of the lock members being able to project into the axial through hole. The main body has an escape groove opening to that inner peripheral surface of the body, which defines the receiving hole, the escape groove allowing the lock members to move between a position in which they project from the radial through holes of the sleeve into the axial through hole, and a position in which they are retreated within the radial through holes. The sleeve has a plurality of axially extending slits formed between each pair of adjacent ones of the radial through holes, and a plurality of flexible fingers provided between the slits.

9 Claims, 10 Drawing Sheets

SOCKET FOR PIPE COUPLING

BACKGROUND OF THE INVENTION

This invention relates to a socket for a pipe coupling adapted to be used for fluid, and more particularly to an inexpensive socket of simple structure which consists of a small number of components and can be assembled easily, and also to a socket having a structure capable of automatically maintaining a plug in a locked state (an inseparable state) and preventing a connection error.

Pipe coupling for fluid are well known from, for example, Japanese Patent Application KOKAI Publication No. 6-272795 and Japanese Utility Model Application KOKOKU Publication No. 56-16448.

The structure of the pipe coupling disclosed in Japanese Patent Application KOKAI Publication No. 6-272795 will be described briefly with reference to FIG. 10 which shows a cross section of the pipe coupling.

In the figure, reference numeral 101 denotes a socket body, in which a seal member 106, an elastic member 107, an inner collar 108, and an urging member 109 supported by the collar 108 are arranged. An outer collar 110 extending from the socket body 101 covers those elements. The outer collar 110 has an inclined surface having a larger diameter at its inner side and contacting the urging member 109, while the inner collar 108 can be slid from the outside.

When in this pipe coupling, insertion of a male member such as a plug or a pipe, not shown, has been started, the front end of the male member contacts the urging member 109, thereby moving the inner collar 108 and the male member to the left in the figure, against the urging force of the elastic member 107. When the urging member 109 has reached the large-diameter portion of the socket body 101, it moves to a radially outer space of the large-diameter portion, whereby the male member is inserted until its front end contacts a step 104, and positioned there. Further, when in this state, a pulling force has been applied to the male member, the urging member 109 is urged toward an inclined surface 113 of the outer collar 110 by the urging force of the elastic member 107, thereby urging the male member against the inclined surface 113. As a result, the male member is prevented from being pulled out of the socket.

The male member can be easily pulled out of the socket body by pushing the front end of the inner collar 108 toward the socket body 101 to enable movement of the urging member 109 to the large diameter portion of the socket body 101.

The structure of the pipe coupling described in Japanese Utility Model Application KOKOKU Publication No. 56-16448 will be described with reference to FIG. 11 which illustrates a cross section of the connector.

The pipe coupling comprises a plug 220 and a socket 230. The plug 220 has an insertion rod 223 with a peripheral groove 224 formed in a peripheral portion thereof and to be engaged with lock balls. The socket 230 is constituted of a main body 231, a sleeve 238, lock balls 241 and a spring 244. The spring 244 and the sleeve 238 are fitted in a cylindrical end chamber 236 formed in an end portion of the main body 231 of the socket 230. The sleeve 238 has a desired number of tapered radial holes 240 formed therein, in which the locking balls 241 are slidably inserted such that they can project from the inner-diameter portion of the sleeve 238. The portion of each lock ball which is opposite to the projecting portion is engaged with an escape groove 243, which has a tapered wedge surface 242 constituted of a peripheral portion of the inner wall of the cylindrical end chamber 236 in the main body 231. A groove is formed in one of the front end surface 231a of the main body 231 and a front end collar 237 incorporated in the sleeve 238, and a pin is provided on the other of them. The axial length of each of the groove and the pin is made to correspond to a distance over which the sleeve slides. As a result, the sleeve 238 is retreated against the elastic force of the spring 244 to release the lock balls 241 and enable attachment and detachment of the plug 220, only when the sleeve 238 is rotated with respect to the main body 231 such that the pin is engaged with the groove.

However, when in the case of the first-mentioned pipe coupling, the outer and inner collars 110 and 108 are assembled, the inner collar 108 with the urging member 109 is inserted into the outer collar 110 which has a uniform diameter as indicated by reference numeral 111, and then the outer collar 110 is cramped to form the inclined surface 113. Thus, the assemblage requires the cramping step and a cramping machine, which is a great obstacle to simplification of the assemblage or reduction of the assemblage cost. Further, the pipe coupling does not have a lock mechanism, and therefore if a force is applied from the outside to the inner collar 108 when the pipe coupling is assembled, it is possible that the urging force of the urging member will be released and the pipe will come out of the socket.

On the other hand, when in the case of the latter pipe coupling, the sleeve 238 is inserted into the socket 230, the lock balls 241 fall from a hole (not shown) formed in the socket into the tapered hole of the sleeve 238, and thereafter the hole in the socket 230 is blocked. Therefore, a great number of assemblage steps are required, which is disadvantageous for reducing the assemblage cost. Moreover, although the pipe coupling includes a lock mechanism which consists of the groove and the pin for preventing the detachment of the plug 220 in the connected state, the locking function of this lock mechanism is effected by the operator rotating the sleeve 238 after the connection of the socket is completed. Therefore, if the lock operation is forgotten, the plug 220 will come out of the socket 230 when an unintentional force has been applied to the sleeve 238 to push it within the socket 230.

BRIEF SUMMARY OF THE INVENTION

The invention has been developed to solve the above-described problems and is aimed at providing a socket for pipe coupling in which a sleeve and a main body can be assembled instantly, and which has a lock function and can avoid erroneous connection of the a plug to be connected thereto.

According to the present invention, there is provided a socket for pipe coupling comprising: a main body member having a receiving hole formed in an end portion thereof for receiving a male member; a sleeve having a front end portion axially slidably inserted in the receiving hole, a base portion located outside the receiving hole, an axial through hole for receiving the male member such that it can slide therein, and a plurality of radial through holes formed therein at circumferentially regular intervals and radially inwardly tapered; and a plurality of lock members received in the radial through holes, part of each of the lock members being able to project into the axial through hole. The main body member has an escape groove opening to that inner peripheral surface of the member, which defines the receiving hole, the escape groove allowing the lock members to move between a position in which they project from the radial through holes of the sleeve into the axial through hole, and a position in which they are retreated within the radial through holes; and the sleeve has a plurality of axially extending slits formed between each pair of adjacent ones of the radial through holes, and a plurality of fingers provided between the slits. The fingers can be elastically bent in a radial and inward direction of the sleeve by the urging force of the main body member which is transmitted via the lock members when the sleeve has been inserted into the receiving hole.

Accordingly, the front end portion of the sleeve can be radially inwardly bent simply by pushing the sleeve into the socket, whereby the sleeve and the socket can be easily assembled.

It is preferable that the radial through holes each have a diameter along the axis of the sleeve, and a diameter along the circumference of the sleeve, which is smaller than the first-mentioned diameter.

According to another embodiment of the invention, the socket further comprises a spring located in the receiving hole for urging the sleeve toward the one end portion of the main body member, and a spring seat ring slidably mounted on the sleeve for supporting one axial end portion of the spring, the spring seat ring being disposed to move toward another axial end portion of the spring against the urging force of the spring when the each lock member is shifted by the male member toward another end portion of the main body element. Preferably, the radial through holes extend up to the front end portion of the sleeve.

When in this embodiment, the plug is connected, the spring seat ring shifts together with the lock members, but the sleeve does not move. Accordingly, at the time of connecting the plug, the sleeve can be locked to prevent disconnection of the plug and socket.

According to a yet another embodiment of the invention, the socket further comprises a lock ring mounted on a portion of the sleeve close to the base portion, the lock ring preventing movement of the sleeve in a direction in which the lock members are retreated within the radial through holes. The lock ring can be formed of a C-shaped elastic ring.

According to another embodiment of the invention, the socket further comprises: a spring located in the receiving hole for urging the lock members toward the one end portion of the main body member; the escape groove having a tapered surface for pressing the lock members urged by the spring in a radial and inward direction of the sleeve, and a stepped portion formed adjacent to the tapered surface for holding the lock members between itself and the outer peripheral surface of the male member to thereby interrupt engagement of the lock members with the tapered surface. In this case, locking of the plug by the lock members before the plug is completely inserted into the socket can be prevented, which prevents incomplete connection of the plug and socket.

More preferably, the main body member has an inwardly tapered surface at the one end portion side, and the sleeve has an inwardly tapered surface at the base portion side. In this case, the sleeve or the plug can be easily inserted into the main body member.

Additional objects and advantages of the invention will be set forth in the description which follows, and in part will be obvious from the description,. or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A connector for fluid according to a first embodiment of the invention will be described with reference to FIGS. 1–3.

Figure 1:
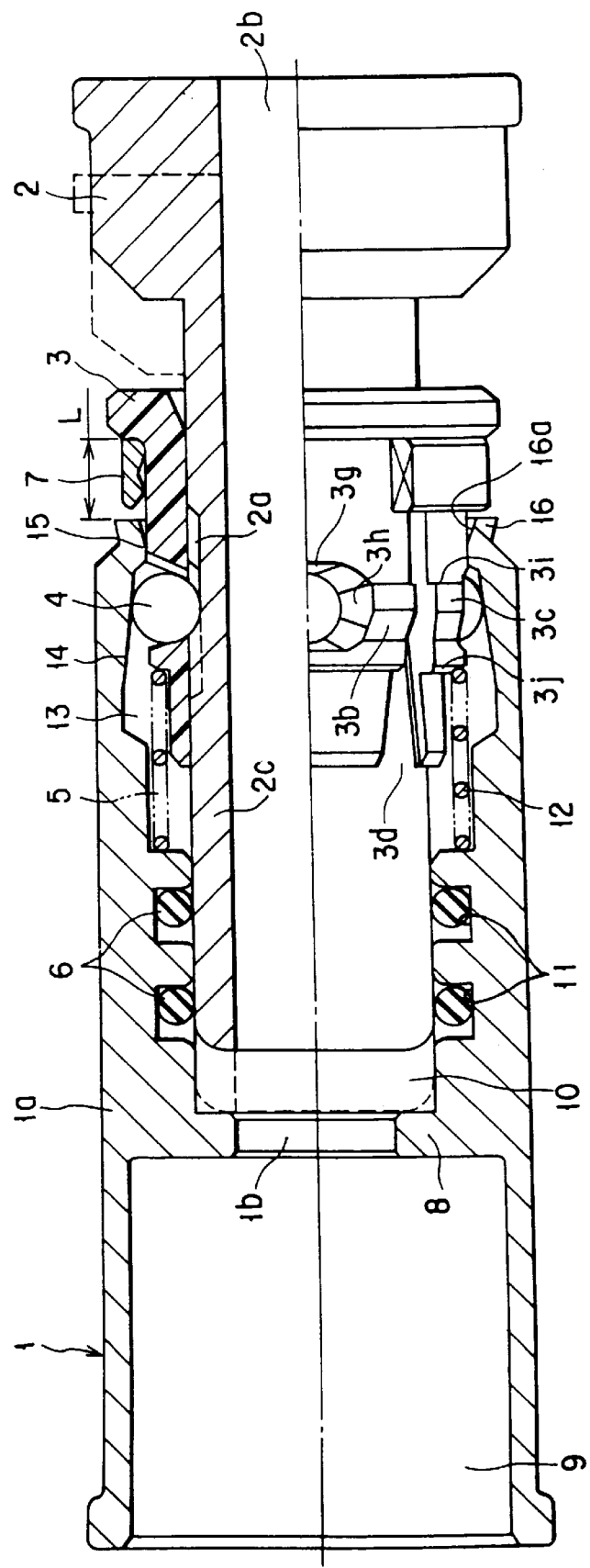
FIG. 1 is a fragmentary sectional view, showing a state in which a socket and a plug incorporated in a pipe coupling according to a first embodiment of the invention are connected.

In FIG. 1, the pipe coupling according to the first embodiment of the present invention is comprised of a socket 1 and a plug 2. When the plug 2 has been inserted in the socket 1, they are connected to each other.

The plug 2 has a fluid passage 2b formed in a center portion thereof, and a wide peripheral groove 2a formed in an outer peripheral portion of an insertion portion 2c thereof for receiving lock members 4 (which will be described later). When high pressure has been applied within the connector, the plug 2 fixedly connected to the socket 1 is urged in its disengaging direction, whereby each lock member 4 is put into contact with a left-hand (in FIG. 1) step of the peripheral groove 2a. Thus, the peripheral groove 2a serves as a stopper for preventing detachment of the plug 2 (as indicated by the solid line in FIG. 1), and also has a function for moving a sleeve 3 to the right to form a clearance L, in which a lock ring 7 (which will be described later) is received when the lock member 4 has engaged with the peripheral groove in a manner which will be described later.

The socket 1 is assembled from a main body 1a, the sleeve 3, the lock members 4, a spring 5, seal members 6 and the lock ring 7. A fluid passage 1b is formed in a center portion of the main body 1a.

A peripheral wall 8 radially inwardly projects from the inner peripheral surface of the fluid passage 1b of the main body 1a. A receiving hole 10 is formed in an end portion of the main body 1a for receiving the plug 2, while a connection port 9 to be connected to a fluid pipe (not shown) is formed in that end portion of the main body 1a, which is opposed to the first-mentioned end portion with the peripheral wall interposed therebetween.

A plurality of recesses 11 which each holds a seal member 6, a spring reception recess 12 with a diameter larger than the outer diameter of an insertion portion 2c of the male member 2, and an escape groove 13 with a diameter larger than the spring reception recess 12 are formed in that inner peripheral wall of the main body 1a, which defines the male member receiving hole 10. The escape groove 13 has a tapered surface 14 having its diameter reduced toward the inlet of the receiving hole 10, and a tip engaging stepped portion 15 as an end portion for guiding the outer periphery of the sleeve 3. Further, an engagement portion 16 for holding the lock ring 7 is formed of the end portion of the main body 1a which defines an outer end periphery of the receiving hole 10. The engagement portion 16 has a tapered surface 16a to be engaged with the sleeve 3 when the sleeve 3 is inserted. The lock ring 7 is formed of a C-shaped resilient member which can be opened.

Figure 2A:
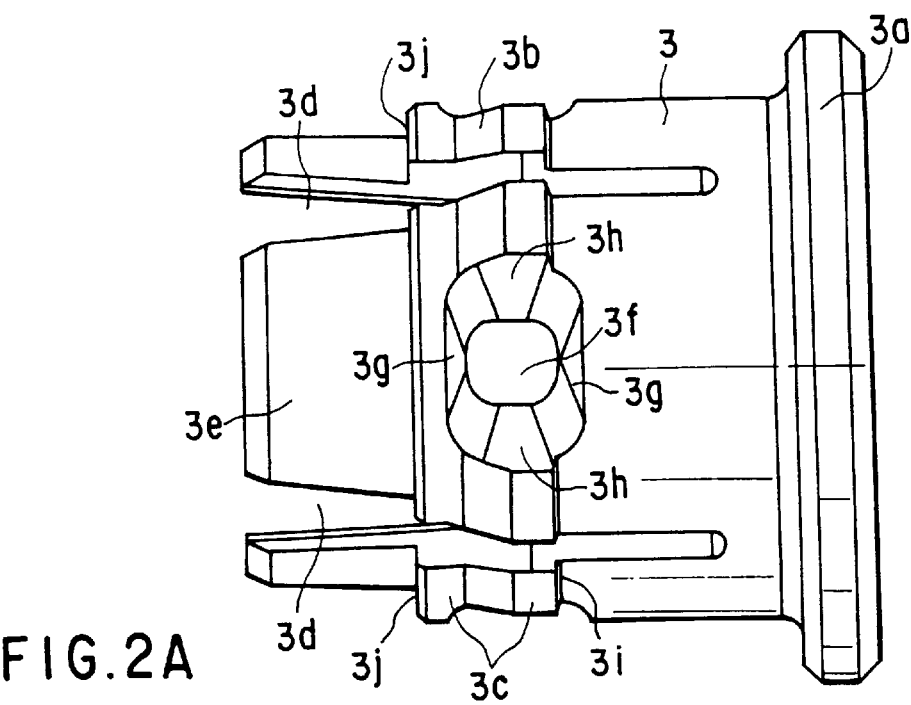
FIGS. 2A and 2B are a plan view and a fragmentary sectional view, respectively, showing a sleeve to be attached to the socket of FIG. 1.
Figure 2B:
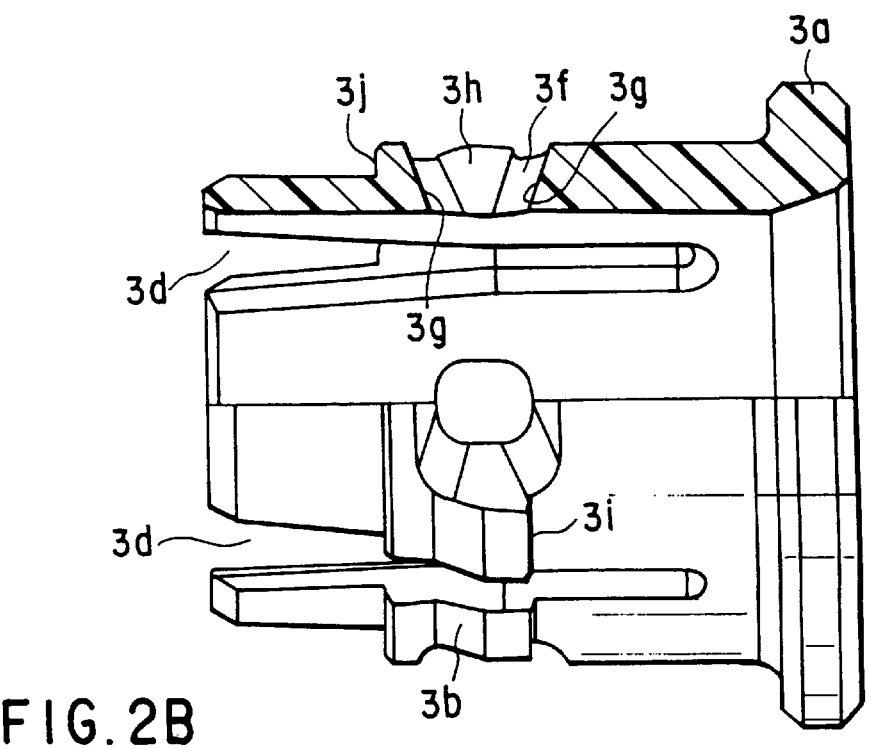

As is shown in FIGS. 2A and 2B, the sleeve 3 to be fitted into the plug receiving hole 10 is formed of a cylindrical member which has a collar 3a provided as a base portion, and an axial through hole formed therein for receiving the plug such that it can slide. The sleeve 3 includes cylindrical central outer peripheral surfaces with tapered surfaces 3b and stepped portions 3c extending continuously from the opposite ends of the tapered surfaces 3b. A plurality of slits 3d are formed axially in the sleeve 3 on the opposite side of the collar 3a to allow free end portions of the sleeve 3 to be radially inwardly warped. A plurality of tapered holes 3f radially extending through the sleeve for holding the lock members 4 are each formed in the tapered surface 3b and the stepped portion 3c provided on a corresponding finger 3e, which is formed between adjacent slits 3d. Each tapered hole 3f has a minor diameter in a circumferential direction of the sleeve and a major diameter in an axial direction of the sleeve. Tapered surfaces 3g which define each tapered hole 3f on the major diameter side have an angle which allows radial outward movement of a corresponding one of the lock members 4. Tapered surfaces 3h which define each tapered hole 3f on the minor diameter side have an angle which allows holding of a corresponding one of the lock members 4 so that the lock members 4 will not fall into a space inside the sleeve 3. When each lock member 4 is held in the sleeve and the plug 2 is inserted in it, the lock member 4 projects to a radially inner level than the outer peripheral surface of the plug 2. A stopper portion 3i, with which the tip engaging stepped portion 15 of the tapered surface 14 of the escape groove 13 formed on the socket side is brought into contact, is formed at each stepped portion 3c on the collar 3a side. On the other hand, each stepped portion 3c on the free end side of the sleeve 3 is provided as a spring seat portion 3j for the spring 5. Although the sleeve 3 is formed of a synthetic resin, it may be formed of a metal if the free end of the sleeve 3 can be resiliently deformed when the slits 3d are formed therein.

The assembly of the socket and the sleeve 3 constructed as above can be instantly performed by simply pushing the sleeve with each lock member 4 into the plug receiving hole 10, with the seal members 6 and the spring 5 mounted in the female member 1, as is shown in FIG. 1.

Specifically, when insertion of the sleeve 3 with the lock members 4 into the plug receiving hole 10 has been started, the spring seat portion 3j of the sleeve 3 contacts the spring 5. The sleeve 3 is further pushed, thereby bringing the tapered surfaces 3b between the stepped portions 3c into contact with the tapered surface 16a of the receiving hole 10. When the sleeve 3 has been further pushed, the fingers 3e are radially inwardly flexed by the tip engaging stepped portions 15, and the stepped portions 3c of the sleeve 3 climbs over the tip engaging stepped portions 15. The sleeve is then restored to its original state. Although at this time, the sleeve 3 is pushed back to the right (in FIG. 1) by the urging force of the spring 5, the stopper portions 3i formed at the stepped portions 3c are engaged with the tip engaging stepped portions 15, thereby preventing the sleeve 3 from slipping out of the hole 10. When the pushing force applied to the sleeve 3 has been released after the above operation, the sleeve 3 is instantly engaged with the plug receiving hole 10 as shown in FIG. 1. Thus, the sleeve 3 can be assembled in a simple manner.

Figure 3:
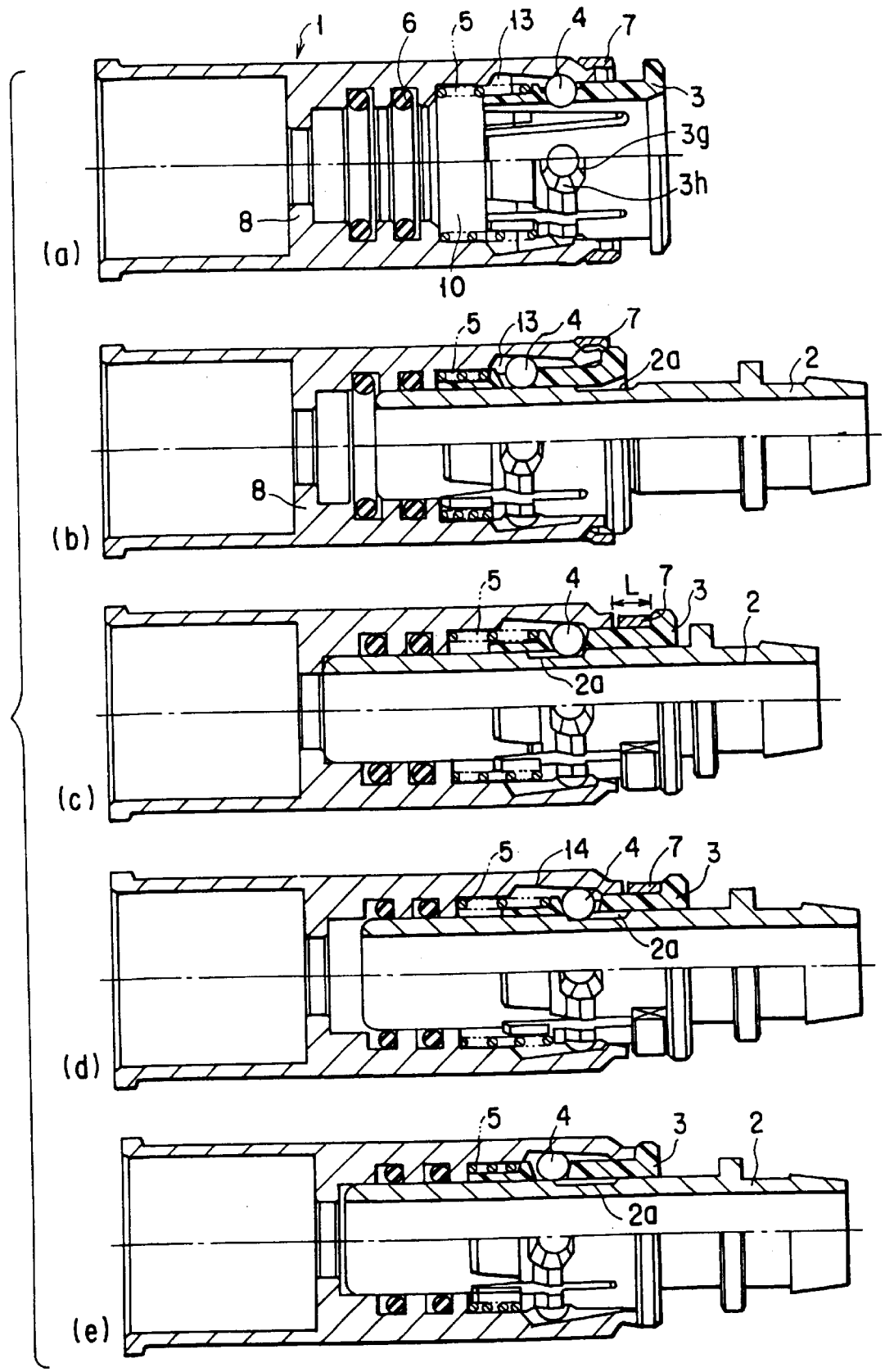
FIG. 3 is a view, useful in explaining states (a)–(e) assumed when the socket and the plug according to the first embodiment are connected to each other.

Referring then to FIG. 3, the operation of the sleeve 3 at the time of connecting the socket 1 to the plug 2 as a male member will be described.

When insertion of the plug 2 into the socket 1 which assumes a state as shown in (a) of FIG. 3 has been started, it first contacts the lock members 4 which project to a radially innerer level than the outer peripheral surface of the plug 2. After the plug is further inserted, the lock members 4 are radially outwardly moved by the major-diameter side tapered surfaces 3g of the tapered holes 3f formed in the sleeve 3, and at the same time, the sleeve 3 is moved to the left against the urging force of the spring 5 ((b) of FIG. 3). The lock members 4 move along the tapered surface 14 which constitutes part of the inner wall of the main body 1a, and enter the escape groove 13. As a result, the plug 2 can move toward the inner portion of the female member 1. When the plug 2 has reached a location near the projecting wall 8, the lock members 4 fall into the peripheral groove 2a of the plug 2, and at the same time, the sleeve 3 is forwarded by the urging force of the spring 5, thereby causing the lock members 4 to be held between the tapered surface 14 of the escape groove 13 and the bottom surface of the peripheral groove 2a of the plug 2. Thus, the plug 2 is connected ((c) of FIG. 3). As a result of the forwarding of the sleeve 3, a clearance L for fitting the lock ring 7 therein is defined. After the sleeve 3 is inserted until the front end of the plug 2 contacts the peripheral wall 8, the connection of the pipe coupling is completed, and the socket and plug 1 and 2 are fixed to each other. When high pressure has been applied within the pipe coupling which is in a fixedly connected state, the plug is shifted to the right (with respect to the orientation depicted in FIG. 3) by the fluid pressure, whereby the lock members 4 are held between the tapered surface 14 and the left-hand (in the figure) stepped portion of the peripheral groove 2a formed in a peripheral portion of the insertion portion 2c of the plug ((d) of FIG. 3). Thus, detachment of the plug 2 is prevented. Moreover, when high pressure has been applied within the pipe coupling, the lock member 4 is engaged with the tip engaging stepped portion 15 of the tapered surface 14, thereby more reliably preventing the detachment of the plug 2.

After that, the lock ring 7 attached to the engagement portion 16 of the socket 1 is fitted between the collar 3a of the sleeve 3 and an end of the socket 1, with the result that movement of the sleeve 3 can be prevented and hence unexpected detachment of the members 1 and 2 can be prevented, even when an unintentional force is applied thereto ((d) of FIG. 3). Further, since each tapered hole 3f has a major diameter in the axial direction of the sleeve 3, no force will act upon the lock members 4 even when the sleeve 3 shakes in the axial direction, with the lock ring 7 fitted. The lock ring 7 may be fitted on the outer periphery of the sleeve 3 after the state shown in (d) of FIG. 3 is obtained.

To detach the plug 2 from the socket 1, the lock ring 7 is released at the state shown in (d) of FIG. 3, and then the sleeve 3 is axially moved against the urging force of the spring 5 as shown in (e) of FIG. 3. As a result, the lock members 4 are moved, by the axial tapered surfaces 3g of the tapered holes 3f formed in the sleeve 3, radially outwardly and simultaneously axially along the tapered surface 14, and reach the escape groove 13. In this state, the plug 2 can easily be removed from the socket 1.

Figure 4:
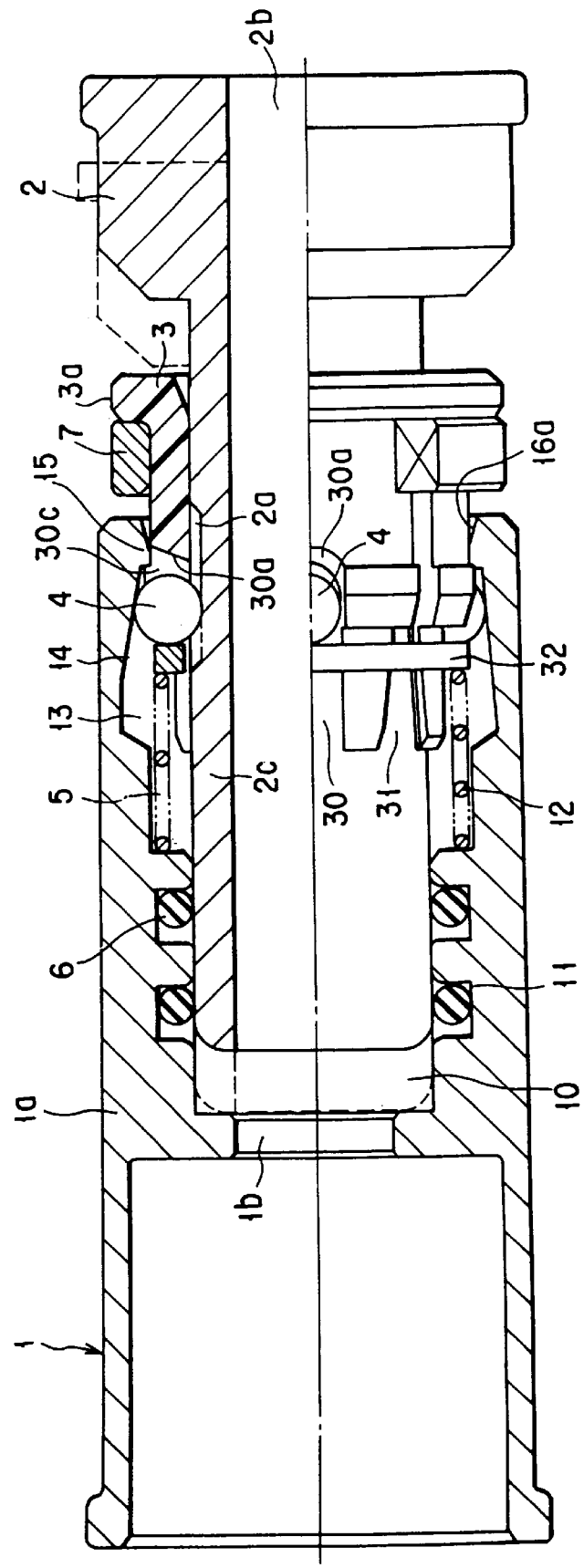
FIG. 4 is a sectional view similar to FIG. 1, showing a pipe coupling according to a second embodiment.

Referring then to FIGS. 4 and 5, a pipe coupling for fluid according to a second embodiment will be described.

The second embodiment is characterized in that the plug 2 can be connected to the socket 1 in a state in which the lock ring 7, used in the first embodiment, is beforehand provided in that outer peripheral portion of the sleeve 3 which is located between the main body 1 and the collar 3a of the sleeve 3, i.e. when the sleeve 3 is in its lock state. The structure of the sleeve 3 itself also significantly differs from that employed in the first embodiment. In other words, although in the first embodiment, the lock ring 7 is shifted to the outer peripheral portion of the sleeve 3 after the socket and plug are connected to each other, thereby executing its locking function, the second embodiment is characterized in that immediately after the plug and socket are connected, the pipe coupling automatically assumes the locking state, without the operation of the lock ring.

In FIG. 4, the pipe coupling of the second embodiment comprises a socket 1 and a plug 2, which have the same structures as those in the first embodiment. In FIG. 4, similar members to those in the first embodiment are denoted by corresponding reference numerals. The sleeve 3 employed in the second embodiment and differing from that of the first embodiment will be described.

Figure 5A:
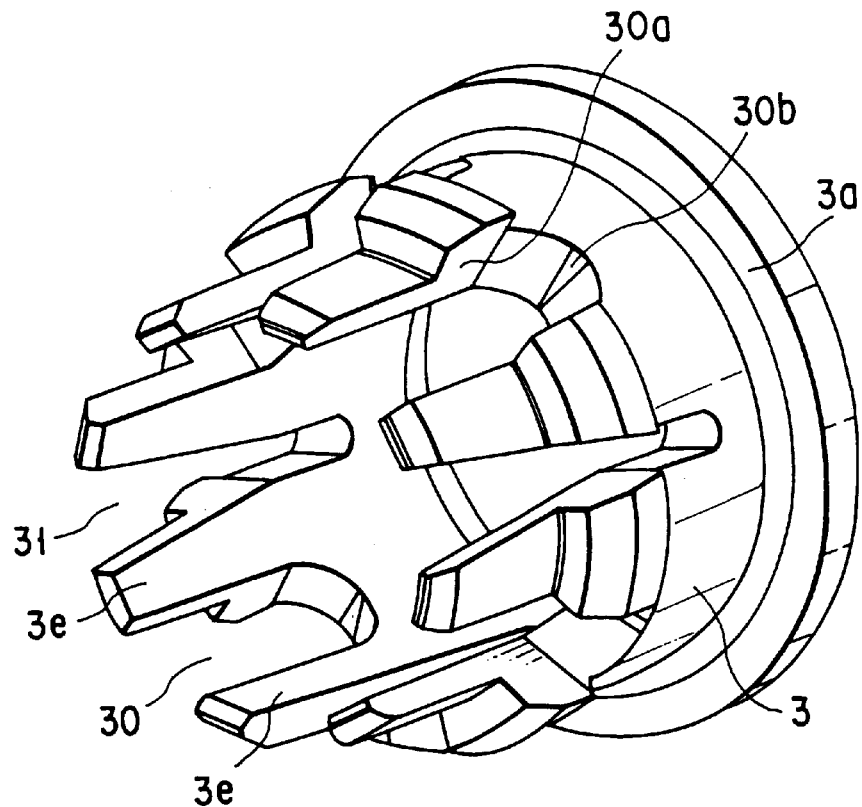
FIGS. 5A and 5B are a perspective view and a fragmentary sectional view, showing a sleeve to be attached to the socket of FIG. 4.
Figure 5B:
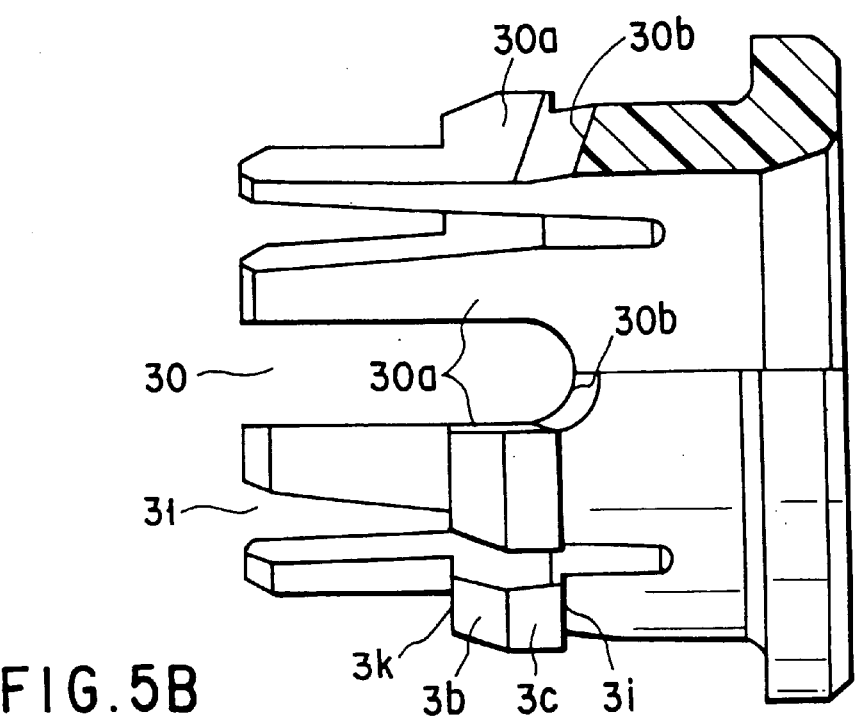

As is shown in FIGS. 5A and 5B, the sleeve 3 to be fitted in the plug receiving hole 10 of the main body 1a is formed of a substantially cylindrical member, which has a collar 3a at one end thereof, and, at the other end thereof, a plurality of slits 31 which enable radially inwardly flexing of the tip of each finger of the sleeve 3, and radial through holes 30 for receiving lock members 4. Accordingly, the radial through holes 30 are formed in the shape of slits extending to the free end portions of the sleeve 3. Those portions of the sleeve 3 which are close to the collar 30a have tapered surfaces 30a for holding the lock members 4, i.e. the inner portions of the radial through holes 30 (guide slits 30 for guiding the lock members) are defined by the tapered surfaces 30a. Further, the innermost portions of the radial through holes or guide slits 30 are defined by tapered surfaces 30b for radially outwardly pushing the lock members 4. A spring seat ring 32 which also serves as a spring seat is slidably attached to that outer peripheral surface of the sleeve 3 in which the slits 30 and 31 are formed. The ring 32 is in contact with ring receiving portions 3k of the sleeve 3, and receives the urging force of the spring 5, thereby urging the sleeve 3 to the right and limiting a lock hole 30c which receives the lock member 4 (see FIG. 4).

The socket 1 and the sleeve 3 constructed as above will be assembled in a manner as below.

In FIG. 4, with the lock member 4 held by the guide slits 30 and the lock ring 7 detachably fitted thereon, the sleeve 3 is pushed into the plug receiving hole 10 of the socket 1 which has the seal members 6 and the spring 5 mounted therein. Thus, the insertion of the sleeve 3 into the receiving hole 10 of the socket 1 can be instantly completed as shown in FIG. 4.

More specifically, when the insertion, into the plug receiving hole 10, of the sleeve 3 with the lock ring 7, the lock members 4 and the spring seat ring 32 mounted thereon has been started, the spring 5 is brought into contact with the spring seat ring 32, and tapered surfaces 3b provided at stepped portions 3c of outer peripheral center portions of the cylindrical sleeve 3 are brought into contact with tapered surface 16a provided at inner peripheral end portion of the insertion port 10. When the sleeve 3 has been further pushed, each finger of the sleeve 3 formed between each adjacent slits is radially inwardly flexed by the pushing force, whereby the stepped portions 3c of the sleeve 3 climbs over the tip engaging stepped portions 15 of the main body 1a. The sleeve is then restored to its original state. The stopper portions 3i of the sleeve 3 are engaged with the tip engaging stepped portions 15, thereby preventing the sleeve 3 from slipping out of the hole 10. When the pushing force applied to the sleeve 3 has been released after the above operation, the sleeve 3 is instantly engaged with the plug receiving hole 10 as shown in FIG. 4. In this assembled state, the sleeve 3 is moved to the right (FIG. 4) by the urging force of the spring 5 via the spring seat ring 32, thereby forming the lock holes 30c between the guide slits 30 and the spring seat ring 32. The lock members 4 are held in the lock holes 30c such that they project to a radially innerer level than the outer peripheral surface of the plug 2.

Figure 6:
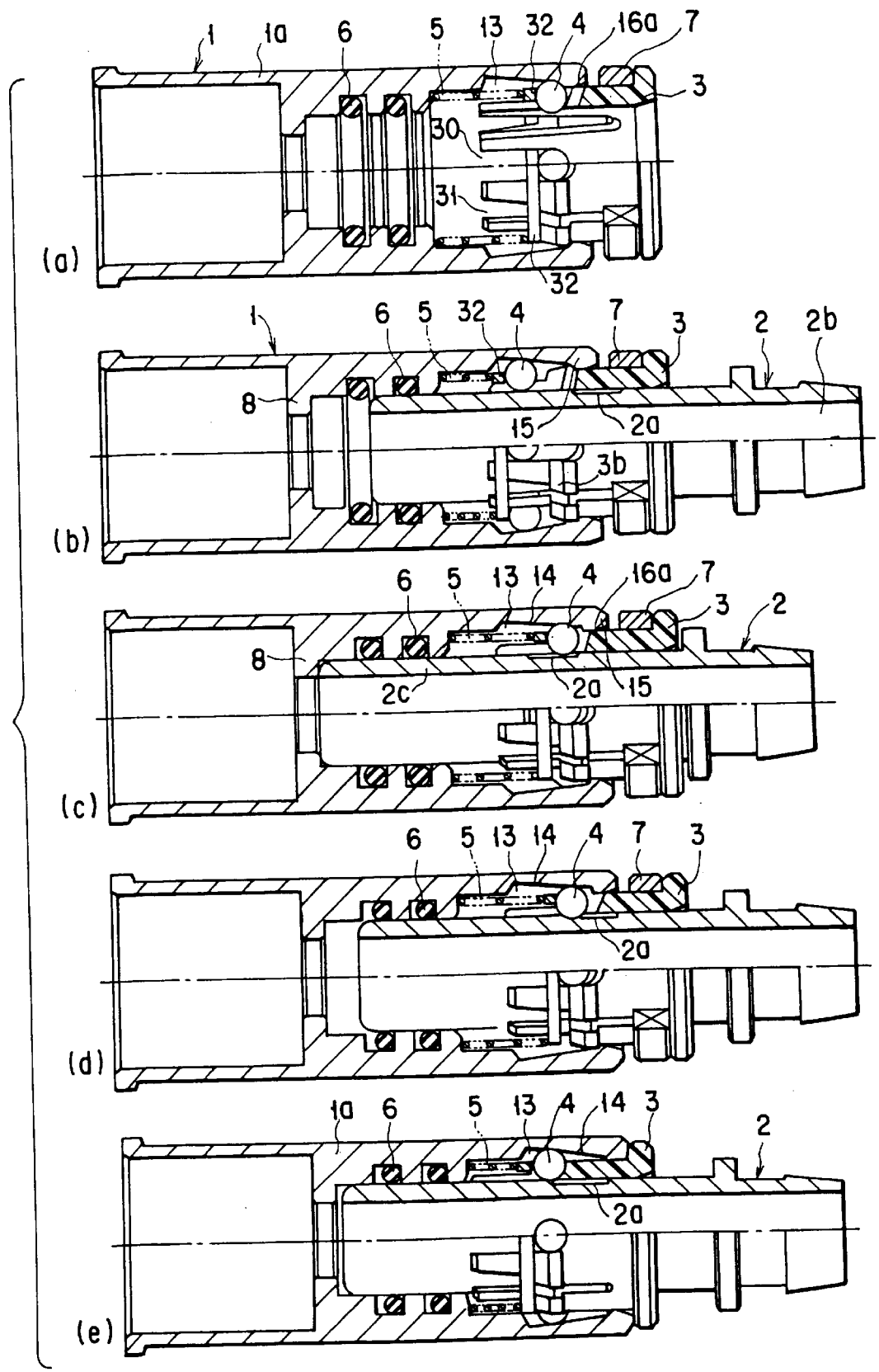
FIG. 6 is a view, useful in explaining states (a)–(e) assumed when the socket and the plug according to the second embodiment are connected to each other.

Referring then to FIG. 6, the operation of the sleeve 3 at the time of connecting the socket 1 to the plug 2 as a male member, which are constructed as above, will be described.

When insertion of the plug 2 into the socket 1 which assumes a state as shown in (a) of FIG. 6 has been started, it first contacts the lock members 4 which project to a radially inner level than the outer peripheral surface of the plug 2. The lock members 4 are further moved along the guide slits 30 in an axial direction (to the left in FIG. 6). At this time, the sleeve 3 does not move. Since the spring seat ring 32 is moved to the left by the pushing force of the lock members 4 against the urging force of the spring 5, the lock holes 30c gradually axially become longer. The lock members 4 are radially outwardly moved, by an end portion of the plug 2, along the tapered surface 14 which constitutes part of the inner wall of the main body 1a, and enter the escape groove 13. As a result, the urging force applied from the lock members 4 to the plug 2 is released, and hence the plug 2 can be inserted into the socket 1 ((b) of FIG. 6). Since, as described above, the lock holes 30c themselves can be enlarged in the axial direction of the sleeve 3 by moving the spring seat ring 32 using the lock members 4, the lock ring 7 can be beforehand mounted between the main body 1a and the collar 3a of the sleeve 3. When the plug 2 has reached a location near the peripheral wall 8, each lock member 4 falls into the peripheral groove 2a of the plug 2, and is simultaneously forwarded by the urging force of the spring 5 via the spring seat ring 32. As a result, the lock holes 3c are shortened along the axis of the sleeve 3, thereby holding the lock members 4 between the tapered surface 14 of the escape groove 13 and the bottom surface of the peripheral groove 2a of the plug 2. Thus, the plug 2 is connected. The connection of the pipe coupling is completed when the front end of the plug 2 has been inserted until it contacts the peripheral wall 8, thereby fixing the socket and plug 1 and 2 to each other ((c) of FIG. 6).

When high pressure has been applied within the pipe coupling which is in a fixedly connected state, the plug is shifted to the right (FIG. 6) by the fluid pressure, whereby the lock members 4 are held between the tapered surface 14 and the left-hand stepped portion of the peripheral groove 2a formed in a peripheral portion of the insertion portion 2c of the plug ((d) of FIG. 6). Thus, detachment of the plug 2 is prevented. Moreover, when high pressure has been applied within the pipe coupling, the lock members 4 are engaged with the tip engaging stepped portion 15 of the tapered surface 14, thereby more. reliably preventing the detachment of the plug 2. Since in this state, the lock ring 7 is beforehand interposed between the socket 1 side end and the collar of the sleeve 3, the sleeve is prevented from moving even when an unintentional force is exerted upon the sleeve, thereby preventing detachment of the plug from the socket.

Further, since the lock holes 30c formed between the spring seat guide ring 32 and the guide slits 30 are axially enlarged when the sleeve 3 is pushed to the right (FIG. 6) by the urging force of the spring 5, a clearance is formed between the main body 1a and the lock ring 7. This means that the lock members 4 are not urged by the tapered surfaces 30b of the guide slits 30 even when the sleeve 3 is moved by an amount corresponding to the clearance. As a result, the socket and plug 1 and 2 are not disengaged from each other.

To detach the plug 2 from the socket 1, the lock ring 7 is removed from the sleeve 3 (the lock ring 7 is formed of a C-shaped resilient ring and can be easily removed), and moved to the left against the urging force of the spring 5 as shown in (e) of FIG. 6. At this time, the lock members 4 are moved, by the tapered surfaces 30b of the guide slits 30 formed in the sleeve 3, radially outwardly and simultaneously axially along the tapered surface 14, and reach the escape groove 13. In this state, the plug 2 can easily be removed from the socket 1.

Since in the second embodiment, the lock holes 30c defined by the guide slits 30 formed in the sleeve 3 and the spring seat ring 32 is contractible and expandable along the axis of the sleeve 3, the plug 2 can be connected to the socket 1 simply by inserting the plug 2 into the socket 1 as in the conventional case, with the lock ring 7 fitted on the outer peripheral surface of the sleeve 3. Accordingly, forgetting of locking after connection of the pipe coupling can be reliably prevented. In other words, since the lock ring 7 is already mounted on the outer peripheral surface of the sleeve before the pipe coupling is connected, movement of the sleeve 3 can be prevented even when an unintentional force is applied to the sleeve 3 after the pipe coupling is connected. This means that the detachment of the plug and socket from each other can be reliably prevented.

When in the above-described first and second embodiments, the plug 2 is inserted into the socket 1, if the insertion operation is stopped and the socket 2 is pulled, before the peripheral groove 2a formed in the outer peripheral surface of the plug 2 for the lock members 4 reaches the lock members 4, the lock members urged by the spring 5 against the tapered surface 14 of the socket 1 is radially outwardly pressed by the plug 2. Accordingly, the plug 2 assumes a state in which it cannot be pulled out of the socket 1, even when the lock members 4 do not fall into the peripheral groove 2a. From this, it is possible that the operator will misunderstand that the connection is completely performed, and hence that the socket and plug 1 and 2 will be incompletely connected, resulting in leakage of a fluid.

To avoid the above, a third embodiment is proposed.

Figure 7:
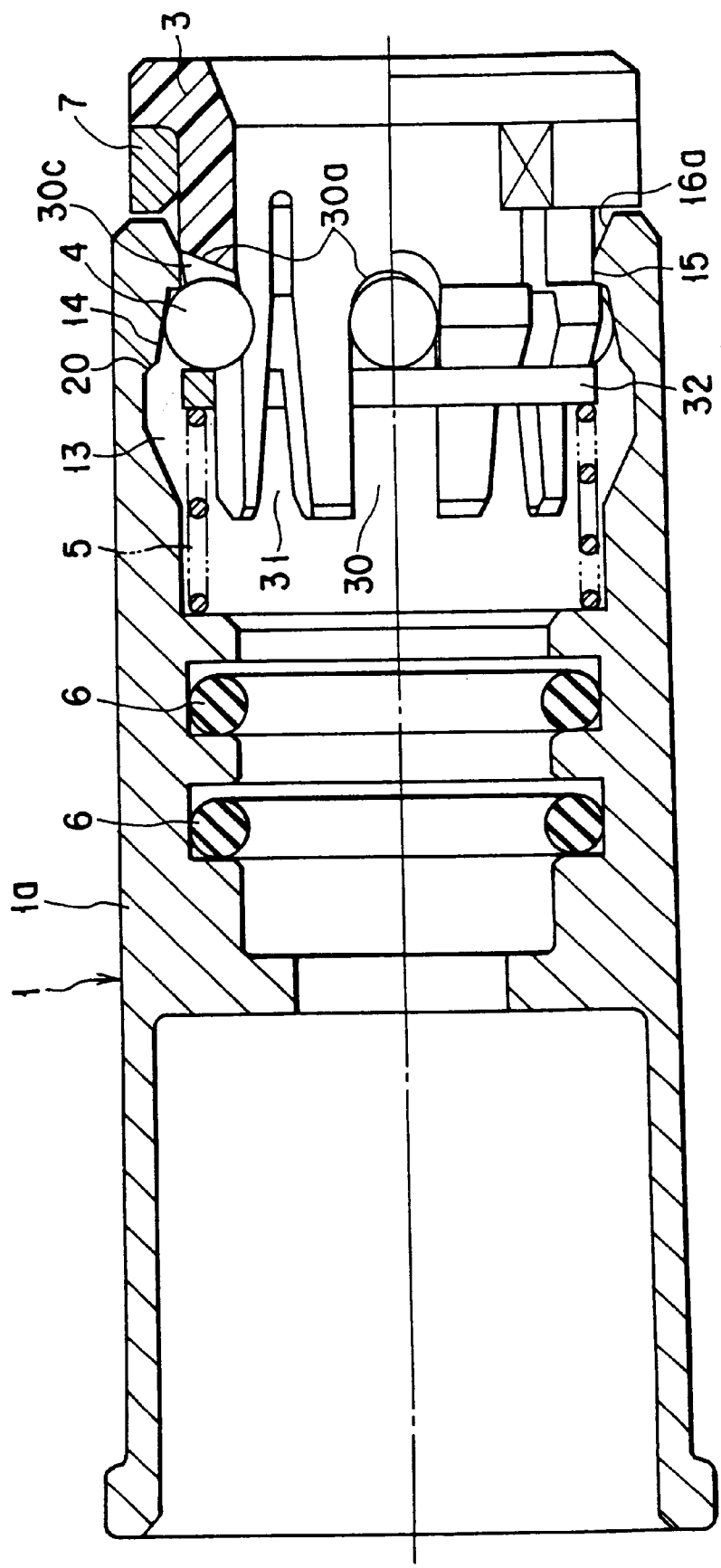
FIG. 7 is a sectional view, showing a pipe coupling according to a third embodiment.
Figure 8:
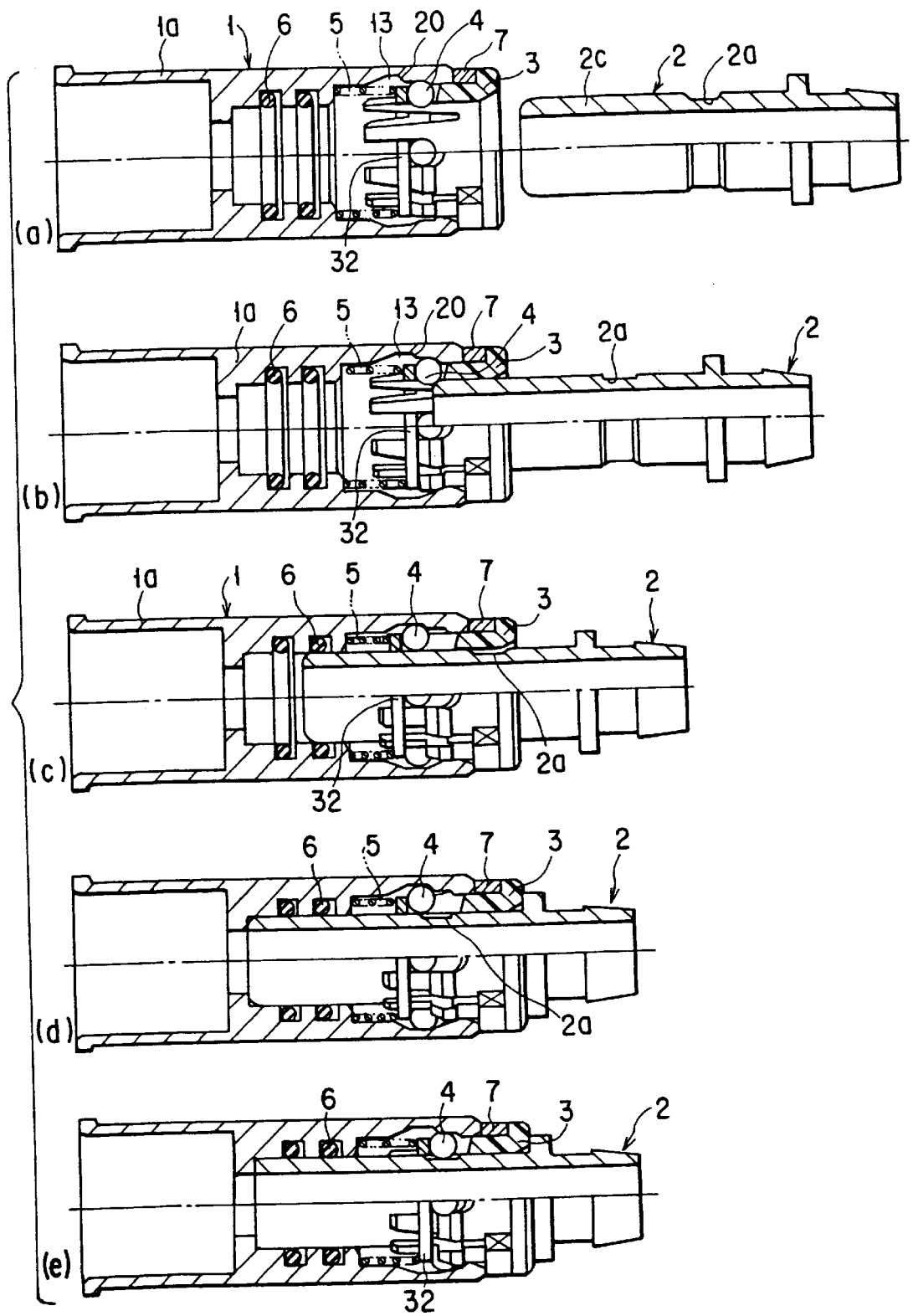
FIG. 8 is a view, useful in explaining states (a)–(e) assumed when the socket and the plug according to the third embodiment are connected to each other.
Figure 9:
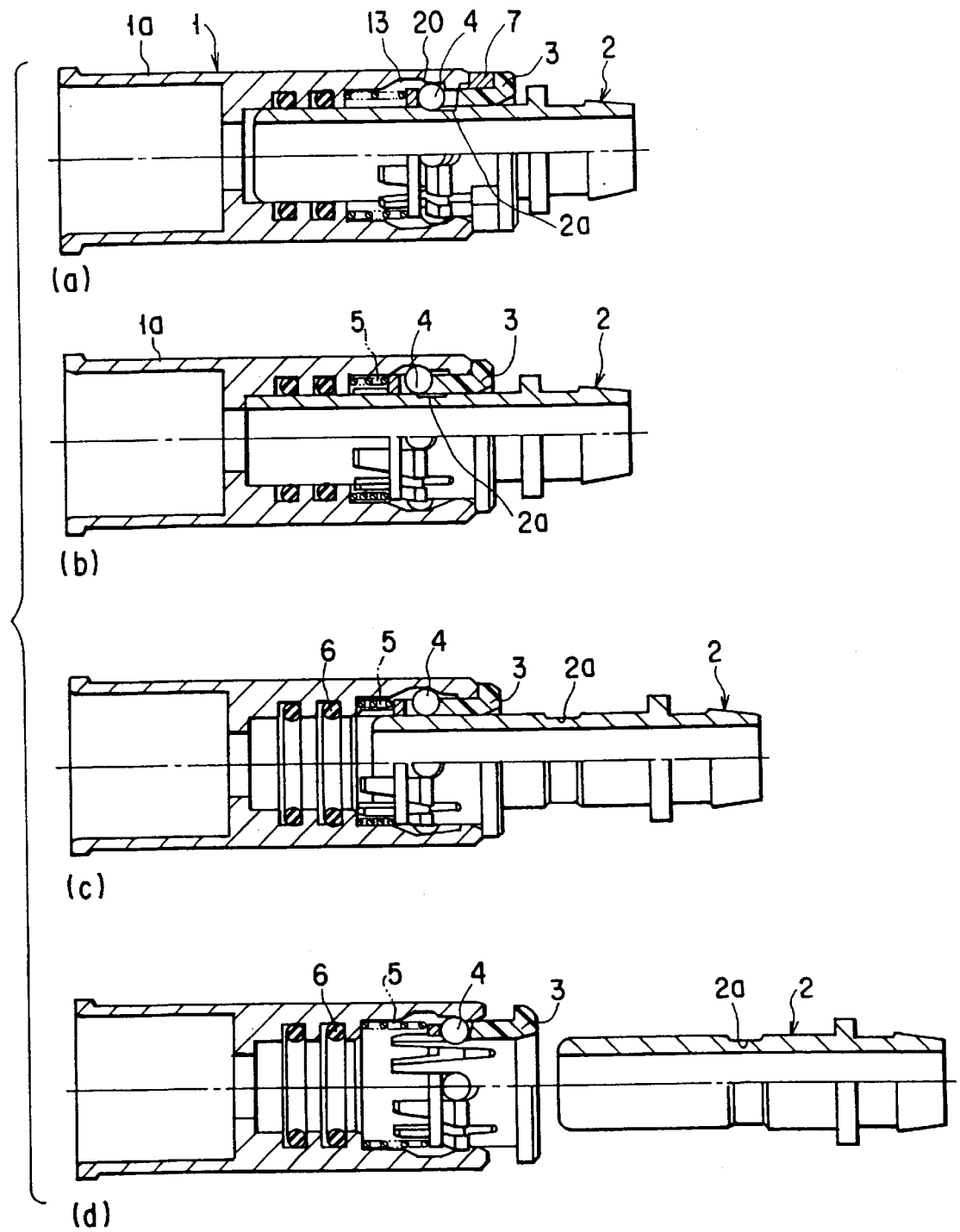
FIG. 9 is a view, useful in explaining states (a)–(d) assumed when the plug is disengaged from the socket.
Figure 10:
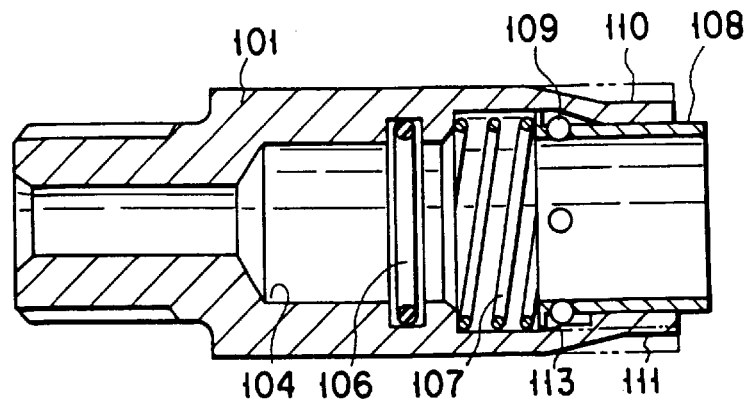
FIGS. 10 and 11 are sectional views, showing conventional pipe coupling.
Figure 11:
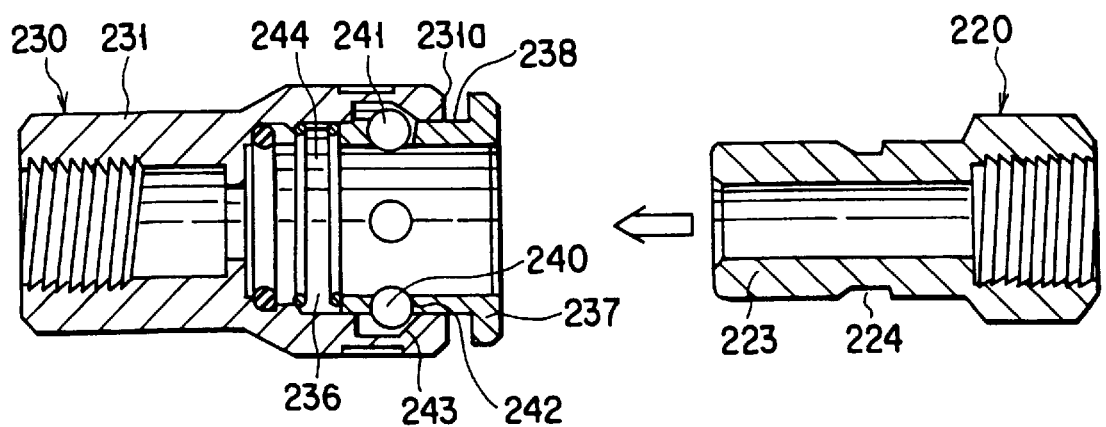

Referring to FIGS. 7–9, a pipe coupling for fluid according to the third embodiment will be described.

The third embodiment is characterized in that an engagement portion 20 is formed at an end of the escape groove 13 formed in the main body 1a in the second embodiment. Because of the engagement portion 20, the socket and plug 1 and 2 cannot be connected unless the lock members 4 are completely engaged with the peripheral groove formed in the plug 2. In other words, the third embodiment differs from the second embodiment only in the shape of the escape groove 13. The other components of the socket and plug 1 and 2 are similar to those of the second embodiment, and description will be given using corresponding reference numerals to denote the similar components.

In FIG. 7, the escape groove 13 of the main body 1a has an engagement portion 20 consisting of a predetermined stepped portion at which the lock members 4 guided along the tapered surface 14 escape from the peripheral groove. As a result, unless the lock members 4 completely fall into the peripheral groove 2a of the plug 2, the socket and plug 1 and 2 cannot be connected to each other since no wedge force acts between the tapered surface 14 and the outer peripheral surface of the plug 2.

Referring to FIGS. 8 and 9, the operation of the pipe coupling at the time of connecting the socket 1 to the plug 2 as a to-be-connected member will be described.

When insertion of the plug 2 into the socket 1 which assumes a state as shown in (a) of FIG. 8 has been started, it first contacts the lock members 4 which project to a radially inner level than the outer peripheral surface of the plug 2, as is shown in (b) of FIG. 8. The lock members 4 are further moved along the guide slits 30 in an axial direction (to the left in FIG. 8). At this time, the sleeve 3 does not move. The spring seat ring 32 is also moved to the left by the pushing force of the lock members 4 against the urging force of the spring 5. The lock members 4 are radially outwardly moved, by an end portion of the plug 2, along the tapered surface 14 which constitutes part of the inner wall of the main body 1a, and enter the escape groove 13 with the engagement portion 20. As a result, the urging force applied from the lock members 4 to the plug 2 is released, and hence the plug 2 can be inserted into the socket 1 ((c) of FIG. 8). When the plug 2 has reached a location near the peripheral wall 8, the lock members 4 fall into the peripheral groove 2a of the plug 2 (the state of the connector shifts from one shown in (d) of FIG. 8 to one shown in (e) of FIG. 8), and are simultaneously forwarded by the urging force of the spring 5 via the spring seat ring 32. As a result, the lock members 4 are held between the tapered surface 14 of the escape groove 13 and the bottom surface of the peripheral groove 2a of the plug 2. Thus, the socket and plug 1 and 2 are connected as shown in (e) of FIG. 8.

When high pressure has been applied within the pipe coupling which is in a fixedly connected state, the plug 2 assumes a state as shown in (a) of FIG. 9, in which the lock members 4 are held between the tapered surface 14 and the left-hand (in the FIG. 9) stepped portion of the peripheral groove 2a formed in a peripheral portion of the insertion portion 2c of the plug. Thus, detachment of the plug 2 is prevented.

To detach the plug 2 from the socket 1, the lock ring 7 is removed from the sleeve 3 as in the second embodiment, and the sleeve 3 is shifted to a state as shown in (b) of FIG. 9. At this time, the lock members 4 are moved, by the tapered surfaces 30b of the guide slits 30 formed in the sleeve 3, radially outwardly and simultaneously axially along the tapered surface 14, and reach the escape groove 13. In this state, the plug 2 can easily be removed from the socket 1 (see (c) and (d) of FIG. 9).

In the third embodiment, the plug 2 can be connected to the socket 1 simply by inserting the plug 2 into the socket 1 as in the conventional case, with the lock ring 7 fitted on the outer peripheral surface of the sleeve 3. Accordingly, forgetting of locking after connection of the plug and socket can be reliably prevented.

Moreover, if in the third embodiment, the insertion of the plug 2 is not completed (as shown in (c) of FIG. 8), the lock members 4 are received in the engagement portion 20 of the escape groove 13. Accordingly, the tapered surface 14 does not apply a radially inwardly urging force to the lock members 4 irrespective of the urging force of the spring 5. This means that the plug and socket 1 and 2 are in a separable state, and hence insufficiently fixed connection of the plug 2 to the socket can be prevented.

The engagement portion 20 can also be provided in the first embodiment. In this case, the same-advantage as in the third embodiment can be obtained.

In addition, although in each embodiment, a conventional plug is assumed, a pipe can be used as the plug member and directly connected to the socket. The pipe to be used as the plug in the third embodiment, however, must have a peripheral groove as employed in the above-described plug member.

It is a matter of course that the invention can be modified in various manners without departing from its spirit and scope, and that the above-described embodiments are just examples in every respect, to which the invention is not limited.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A socket for a pipe coupling, the socket comprising:
a main body member having a receiving hole formed in an end portion thereof for receiving a male member;
a sleeve having a front end portion axially slidably inserted in the receiving hole, a base portion located outside the receiving hole, an axial through hole for receiving the male member such that the male member can slide therein, and a plurality of radial through holes formed in the sleeve at circumferentially regular intervals and radially inwardly tapered; and
a plurality of lock members received in the radial through holes, part of each of the lock members being able to project into the axial through hole,
the main body member having an escape groove opening to an inner peripheral surface of the main body member defining the receiving hole, the escape groove allowing the lock members to move between a position in which the lock members project from the radial through holes of the sleeve into the axial through hole, and a position in which the lock members are retreated within the radial through holes; and
the sleeve having a plurality of axially extending slits formed between respective pairs of adjacent ones of the radial through holes, and a plurality of fingers provided between the slits, the fingers being able to be elastically bent in a radial and inward direction of the sleeve by an urging force exerted by the main body member when the sleeve has been inserted into the receiving hole.

2. A socket according to claim 1, wherein the radial through holes each have a longitudinal dimension along the axis of the sleeve, and a circumferential dimension along the circumference of the sleeve, which circumferential dimension is smaller than the longitudinal dimension.

3. A socket according to claim 1, further comprising a spring located in the receiving hole for urging the sleeve toward the one end portion of the main body member, and a spring seat ring slidably mounted on the sleeve for supporting one axial end portion of the spring, the spring seat ring being disposed to move toward another axial end portion of the spring against the urging force of the spring when said each lock member is shifted by the male member toward another end portion of the main body element.

4. A socket according to claim 3, wherein the radial through holes extend up to the front end portion of the sleeve.

5. A socket according to claim 1, further comprising a lock ring mounted on a portion of the sleeve close to the base portion, the lock ring preventing movement of the sleeve in a direction in which the lock members are retreated within the radial through holes.

6. A socket according to claim 1, further comprising: a spring located in the receiving hole for urging the lock members toward the one end portion of the main body member, and wherein the escape groove has a tapered surface for pressing the lock members urged by the spring in a radial and inward direction of the sleeve, and a stepped portion formed adjacent to the tapered surface for holding the lock members between the stopped portion and the outer peripheral surface of the male member to thereby interrupt engagement of the lock members with the tapered surface.

7. A socket according to claim 1, wherein the main body member has an inwardly tapered surface at the one end portion side.

8. A socket according to claim 7, wherein the sleeve has an inwardly tapered surface at the base portion side.

9. A pipe coupling comprising a cylindrical plug member having a peripheral groove formed in an outer peripheral surface, and a socket member to be connected to the plug member,
wherein the socket member includes:
a main body member having a receiving hole formed in an end portion thereof for receiving a male member;
a sleeve having a front end portion axially slidably inserted in the receiving hole, a base portion located outside the receiving hole, an axial through hole for receiving the male member such that the male member can slide therein, and a plurality of radial through holes formed in the sleeve at circumferentially regular intervals and radially inwardly tapered; and
a plurality of lock members received in the radial through holes, part of each of the lock members being able to project into the axial through hole, the main body member having an escape groove opening to an inner peripheral surface of the main body member defining the receiving hole, the escape groove allowing the lock members to move between a position in which the lock members project from the radial through holes of the sleeve into the axial through hole, and a position in which the lock members are retreated within the radial through holes; and
the sleeve having a plurality of axially extending slits formed between respective pairs of adjacent ones of the radial through holes, and a plurality of fingers provided between the slits, the fingers being able to be elastically bent in a radial and inward direction of the sleeve by an urging force exerted by the main body member when the sleeve has been inserted into the receiving hole.

* * * * *